United States Patent [19]

Webber

[11] 4,300,497
[45] Nov. 17, 1981

[54] PREVAPORIZING DIESEL PRECOMBUSTION CHAMBER

[75] Inventor: William T. Webber, Los Angeles, Calif.

[73] Assignee: Rockwell International Corporation, El Segundo, Calif.

[21] Appl. No.: 164,395

[22] Filed: Jun. 30, 1980

[51] Int. Cl.³ .............................................. F02B 3/00
[52] U.S. Cl. .................................. 123/254; 123/292; 123/270; 123/256; 123/283
[58] Field of Search ..................... 123/254, 292, 270

[56] References Cited

U.S. PATENT DOCUMENTS

| | | | |
|---|---|---|---|
| 1,134,858 | 4/1915 | Huid | 123/292 |
| 1,550,104 | 8/1925 | Schwer | 123/292 |
| 2,305,791 | 12/1942 | Maruhn | 123/254 |
| 2,456,080 | 12/1948 | Pe | 123/254 |
| 3,140,697 | 7/1964 | Perus | 123/254 |
| 3,809,030 | 5/1974 | Moiroux | 123/292 |
| 3,911,878 | 10/1975 | Hofbauer | 123/292 |

*Primary Examiner*—Ronald B. Cox
*Attorney, Agent, or Firm*—H. F. Hamann; Robert M. Sperry

[57] ABSTRACT

An improved diesel engine wherein fuel is preheated and vaporized within the precombustion chamber during a substantial portion of the engine cycle in which the precombustion chamber is isolated from the cylinder by an isolation valve. Compressed air from the engine cylinder is admitted to the precombustion chamber near the end of the compression stroke by the timed opening of the isolation valve. The precombustion chamber is shaped to enhance mixing of the compressed air with the preheated and vaporized fuel.

9 Claims, 4 Drawing Figures

PREVAPORIZING DIESEL PRECOMBUSTION CHAMBER

BACKGROUND OF THE INVENTION

1. Field of the Invention

This invention relates to diesel engines and is particularly directed to means for enhancing fuel combustion in diesel engines.

2. Description of the Prior Art

In recent years, increasing concern over the limits of the world's petroleum reserves has caused increased interest in diesel engines due to their greater fuel efficiency over conventional internal combustion engines and their ability to burn alternative fuels. Unfortunately, diesel engines still fall far short of complete efficiency, and tend to outdo conventional engines in producing particulate emissions which contribute significantly to air pollution. Many attempts have been made to improve the efficiency of diesel engines and to decrease their production of pollutant emissions. However, none of the prior art techniques has been entirely satisfactory, and the search for improvement continues.

BRIEF SUMMARY AND OBJECTS OF THE INVENTION

These disadvantages of the prior art are overcome with the present invention, and an improved diesel engine is provided having greatly improved combustion characteristics, thereby achieving substantially increased fuel efficiency and, at the same time, yielding significantly less particulate emissions. The advantages of the present invention are preferably attained by preheating and prevaporizing the fuel within the precombustion chamber, while isolating the precombustion chamber from the engine cylinder during a substantial portion of the engine cycle in order to maintain conditions of pressure and temperature most suitable for vaporization, admitting compressed air from the engine cylinder into the precombustion chamber near the end of the compression stroke of the piston, and shaping the precombustion chamber to enhance mixing of said compressed air with said preheated and vaporized fuel.

Accordingly, it is an object of the present invention to provide an improved diesel engine.

Another object of the present invention is to provide a diesel engine having improved combustion characteristics.

A further object of the present invention is to provide a diesel engine having improved fuel efficiency.

An additional object of the present invention is to provide a diesel engine having reduced particulate exhaust emissions.

A specific object of the present invention is to provide an improved diesel engine wherein fuel is preheated and vaporized within the precombustion chamber during a substantial portion of the engine cycle in which the precombustion chamber is isolated from the cylinder by an isolation valve. Compressed air from the engine cylinder is admitted to the precombustion chamber near the end of the compression stroke by the timed opening of the isolation valve. The precombustion chamber is shaped to enhance mixing of the compressed air with the preheated and vaporized fuel.

These and other objects and features of the present invention will be apparent from the following detailed description, taken with reference to the accompanying drawings.

DETAILED DESCRIPTION OF THE PREFERRED EMBODIMENTS

Figure 1:
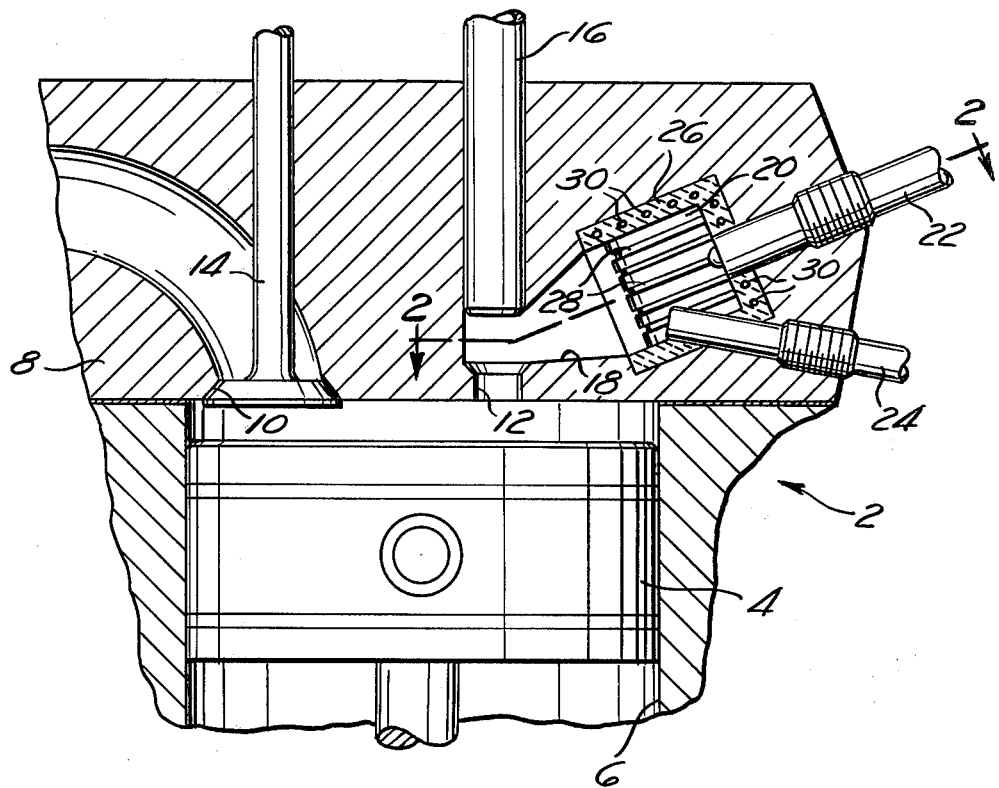
FIG. 1 is a diagrammatic representation of a diesel engine embodying the present invention.

In that form of the present invention chosen for purposes of illustration in FIG. 1, a diesel engine is shown indicated generally at 2, having a piston 4 movable within a cylinder 6. The head 8 of the cylinder 6 is formed with openings 10 and 12. Valve 14 represents intake and/or exhaust valves which serve to close opening 10 and is operable, in a conventional manner, to permit intake of air and discharge of exhaust products. Isolation valve 16 is seated in opening 12 and is operable to close opening 12 from the beginning of the exhaust stroke of piston 4 to near the end of the compression stroke. Opening 12 communicates, via throat 18, with precombustion chamber 20 and a suitable fuel injector 22 serves to deliver fuel into precombustion chamber 20, in a predetermined manner, for subsequent ignition by suitable means, such as glow plug 24.

Figures 2, 3:
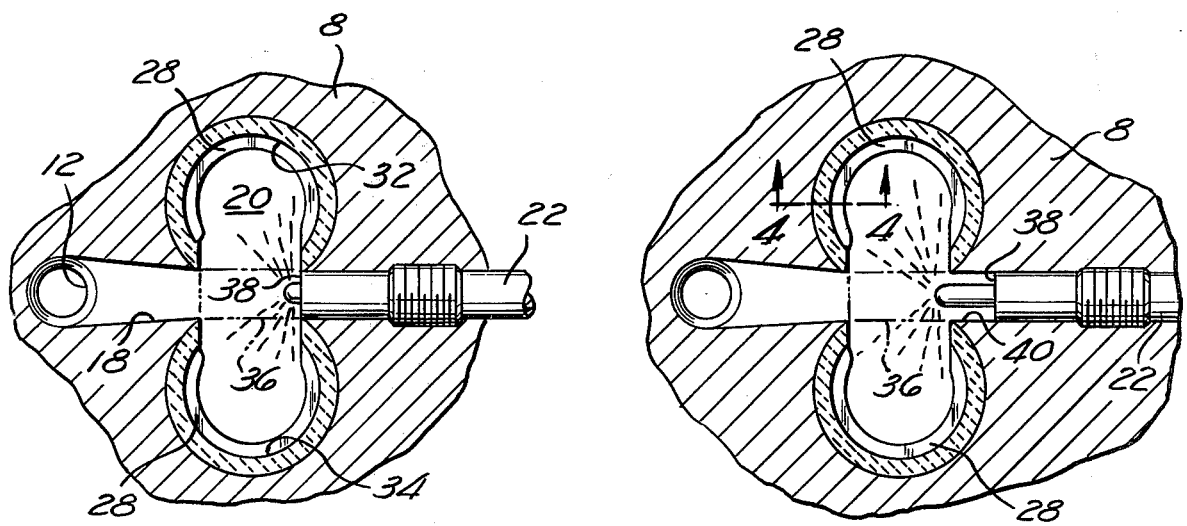
FIG. 2 is a transverse section through the diesel engine of FIG. 1, taken on the line 2—2 of FIG. 1.
FIG. 3 is a view, similar to that of FIG. 2, showing an alternative form of the present invention.
Figure 4:
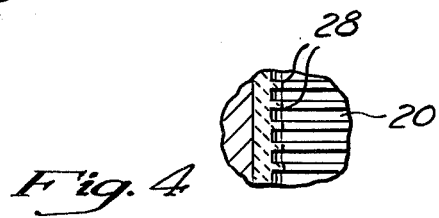
FIG. 4 is a vertical section through the precombustion chamber of FIG. 3.

As seen in FIGS. 1 and 2, the precombustion chamber 20 may be surrounded by a layer 26 of ceramic or other suitable thermal insulating material to retard heat loss from the precombustion chamber 20 and to maintain the temperature of the precombustion chamber in the range of about 400° F. to 1000° F., thereby enhancing vaporization of the fuel delivered by the injector 22. If desired, vanes 28 or the like may be provided on the walls of the precombustion chamber 20 to further enhance thermal transfer to the fuel and, hence, to promote vaporization. As an additional alternative, heating means such as electrical resistance wires 30 may be embedded in the walls of the precombustion chamber 20 and may be energized by a suitable source (not shown) to maintain the temperature of the precombustion chamber 20 within the desired range.

As shown, the precombustion chamber 20 is formed with two generally circular portions 32 and 34, separated by a generally rectangular portion, as indicated by dashed lines at 36 in FIG. 2. The portions 32 and 34 are configured to promote mixing of the air entering the precombustion chamber 20 to further enhance mixing of the air with the prevaporized fuel. Although portions 32 and 34 are shown as being generally circular, it will be understood that other configurations which promote mixing would be equally desirable. The rectangular portion 36 provides an abrupt wall 38 directly in the path of the air entering precombustion chamber 20 through opening 12 and throat 18, and serves to establish a standing shock wave in the region of the rectangular portion 36 in front of wall 38. This shock wave contributes to rapid ignition of the vaporized fuel and aids in mixing the incoming air with the vaporized fuel. Throat 18 forms the incoming air into a jet, which entrains the fuel vapors, enhances formation of the shock wave, and drives mixing action induced by portions 32 and 34. If desired, the shock wave formation may be enhanced by elongating the rectangular portion 36 of the precombustion chamber, as seen at 40 in FIG. 3.

In use, isolation valve 16 serves to close opening 12 from about the beginning of the exhaust stroke of piston 4 until near the end of the compression stroke. Shortly after valve 16 closes, fuel injector 22 sprays a predetermined amount of fuel into precombustion chamber 20. This fuel will be vaporized in the precombustion chamber 20 under controlled conditions of pressure and temperature and while isolated from the charge of air contained in cylinder 6. The vaporization takes place to a limited extent from heat transfer from the residual gases trapped in precombustion chamber 20, and to a much greater extent from heat transferred to the fuel from the hot walls and vanes 28 of the precombustion chamber 20. For this reason, it is important to shape the precombustion chamber 20 and to direct the injector 22 so as to deposit the fuel on the walls of the precombustion chamber 20 and vanes 28 so as to form an evenly distributed thin film of fuel on these heated surfaces. After the isolation valve 16 has been opened, the highly compressed air from cylinder 6 rushes through opening 12 and throat 18 to form a jet which rapidly entrains the prevaporized fuel to form a combustible mixture. After ignition and combustion have been initiated, the contents of the precombustion chamber 20 will expand back through opening 12 into cylinder 6 to drive piston 4 for the power stroke. Obviously, the ignition and initial combustion of the fuel tends to heat the walls of the precombustion chamber 20 and insulation 26 and this, together with heating wires 30 and the like, serves to maintain the temperature of the precombustion chamber 20 in the range of about 400° F. to 1200° F. Thus, when valve 16 recloses and the next charge of fuel is delivered into the precombustion chamber 20, the elevated temperature will promote vaporization of the fuel.

Near the end of the compression stroke of piston 4, valve 16 opens and compressed air from cylinder 6 rushes through opening 12, is accelerated and formed into a jet by throat 18 and is directed against wall 38 to establish a standing shock wave in rectangular region 36 adjacent wall 38. The standing shock wave and glow plug 24 promote ignition of the vaporized fuel which initially fills the precombustion chamber 20. The configuration creates a shear layer between the fuel vapor and air jet, and induces swirling which enhances the mixing of the compressed air with the vaporized fuel which promotes more complete combustion of the fuel. This improved combustion provides increased fuel efficiency and yields significantly reduced particulate emissions.

Numerous variations and modifications may be made without departing from the present invention. Accordingly, it should be clearly understood that the form of the present invention described above and shown in the accompanying drawings are illustrative only and are not intended to limit the scope of the present invention.

What is claimed and desired to be secured by Letters Patent of the United States is:

1. A diesel engine comprising:
 a cylinder;
 a piston slidable within said cylinder;
 a precombustion chamber having a generally rectangular portion located in the path of air entering said chamber, and a pair of generally circular portions located on opposite sides of said rectangular portion;
 an opening communicating said rectangular portion of said precombustion chamber with said cylinder;
 valve means operable near the beginning of the exhaust stroke of said piston to close said opening;
 fuel injector means for delivering fuel into said precombustion chamber shortly after closing of said valve means; and
 means for actuating said valve means near the end of the compression stroke of said piston to open said opening to allow compressed air from said cylinder to rush into said rectangular portion of said precombustion chamber.

2. A diesel engine of claim 1 further comprising thermal stabilization means for maintaining the temperature in said precombustion chamber in the range of 400° F. to 1200° F.

3. The diesel engine of claim 2 wherein said thermal stabilization means is a layer of insulating material surrounding said precombustion chamber.

4. The diesel engine of claim 2 wherein said thermal stabilization means is electrical wires embedded in the walls of said precombustion chamber.

5. The diesel engine of claim 1 further comprising a plurality of protuberances projecting into said precombustion chamber to enhance thermal transfer to fuel in said precombustion chamber.

6. The diesel engine of claim 5 wherein said protuberances are vanes.

7. The diesel engine of claim 1 wherein said precombustion chamber is formed to cause swirling of air entering said chamber to enhance vaporization of fuel within said chamber and mixing of said air with said fuel.

8. The diesel engine of claim 1 further comprising throat means connecting said precombustion chamber with said opening and serving to accelerate the flow of air entering said opening and to form said flow into a jet.

9. The diesel engine of claim 1 further comprising an abrupt wall positioned in said precombustion chamber in the path of air entering from said opening.

* * * * *